(No Model.)
R. SOLANO.
VACUUM BRAKE PIPE COUPLING.
No. 360,924. Patented Apr. 12, 1887.
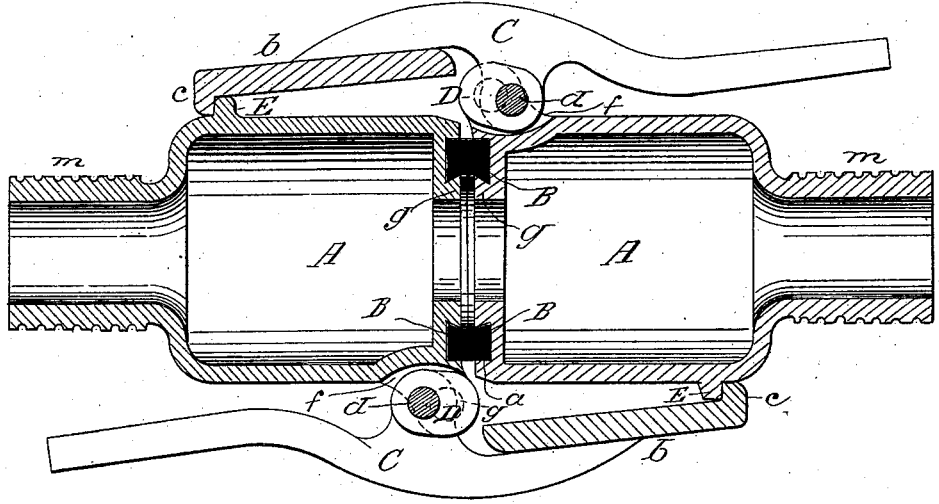
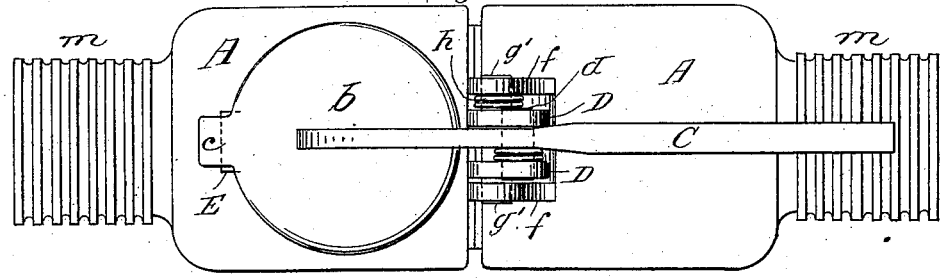
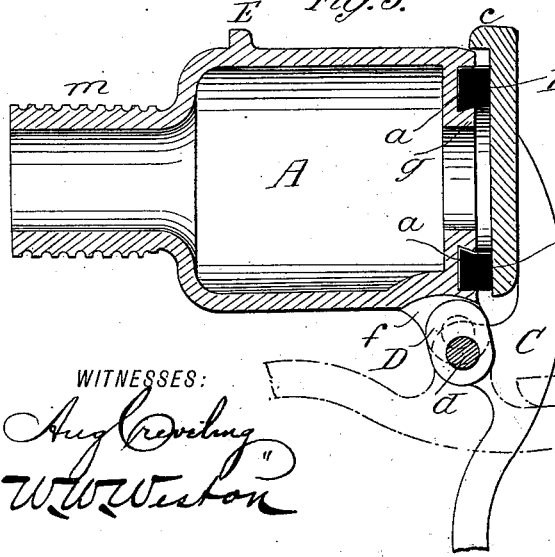
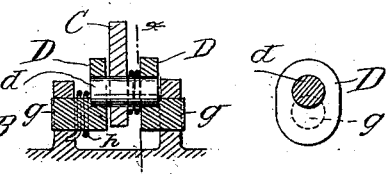
WITNESSES:
Aug Creveling
W. W. Weston
INVENTOR
Renaldo Solano
BY
Chas. N. Forbes
ATTORNEY

UNITED STATES PATENT OFFICE.

RENALDO SOLANO, OF BROOKLYN, N. Y., ASSIGNOR OF TWO-THIRDS TO JOHN W. HOWARD AND DAVID R. MORSE, BOTH OF SAME PLACE.

VACUUM-BRAKE PIPE-COUPLING.

SPECIFICATION forming part of Letters Patent No. 360,924, dated April 12, 1887.

Application filed August 3, 1886. Serial No. 200,862. (No model.)

*To all whom it may concern:*

Be it known that I, RENALDO SOLANO, a citizen of the United States, residing at Brooklyn, in the county of Kings and State of New York, have invented a new and useful Improvement in Vacuum-Brake Pipe-Couplings, of which the following is a specification, reference being had to the accompanying drawings, forming a part of the same, in which—

Figure 1 is a vertical longitudinal sectional view of a united coupler embodying my invention; Fig. 2, a plan view of the same; Fig. 3, a vertical longitudinal section of a half-section of the coupler with the valve closed; Fig. 4, a vertical cross-section of the eccentric pivotal connection on the line $z\, z$, Fig. 3; and Fig. 5, a detached cross-section of Fig. 4 on the line $x\, x$.

In order that others may understand and practice my invention, I will first proceed to describe a device embodying it, and subsequently to point out in the claims its novel features.

A is a section or half of the coupling device, each section or half being the counterpart of the other, and secured to the flexible hose or pipe at $m$, which forms the connection between the cars, so that when the respective sections are brought together one will be a right half and the other a left half of the coupling. Each section has an opening at right angles to the coupler at each end, and on the face $g$ a rubber gasket, B, is placed in an annular groove, $a$. This gasket is constructed so that it can be changed at will, and is retained in place by its cross-sectional form, as shown.

C is a lever rigidly connected with a round disk or cover, $b$, and having at its end a projecting catch, $c$.

D is an eccentric on which the lever C operates or turns independently, the lever C being on a small shaft, $d$. The "yielding eccentric pivot" D rotates upon trunnions $g'$, journaled in fixed lugs $f\,f$, and the lever C is journaled at $d$ to the eccentric D. The spring $h$ is wound around the shaft $g$ of the eccentric, and has one end fastened thereto and the other end secured to one of the lugs $f$, and a similar spring is wound around the shaft $d$ of the lever C, and the ends secured to the lever C and to the eccentric D.

E is a lug which the catch $c$ of the lever C engages with to secure the two sections or half-couplers together.

Having now described the various parts constituting the coupler, I will proceed to describe the operation.

When it is desired to connect two trains or cars together, the operator takes in each hand the half-coupling connected with the adjacent cars and turns the lever C to a horizontal position, as shown in dotted lines, Fig. 3. When the rubber gaskets are brought in contact, the lever C is released until the catch $c$ engages with the lug E. The operator then lowers his hand to a point a little above the eccentric and presses downward, thus turning the eccentric to a point below its center, and by such movement drawing the couplers together, so that the rubber gasket B will be compressed together and prevent leakage.

The device is very simple, and will be readily understood from the foregoing description. Therefore

What I claim, and desire to secure by Letters Patent, is—

1. A vacuum-brake pipe-coupling consisting of two half-sections, each half being the counterpart of the other, and provided with a hand-lever, C, engaging with the other half-section, D, and having a yielding eccentric pivot, as described.

2. In a vacuum-brake pipe-coupling composed of counterpart half-sections, the combination of the lever C, having a yielding eccentric pivot, and interposed rubber gasket B, placed outside of and around the periphery of the opening.

3. In a vacuum-brake pipe-coupling substantially as described, a lever, C, pivoted to a half-section of the coupling by means of a yielding eccentric pivot, and provided with a rigid extension in the form of a plate or disk, constructed to engage with the adjacent half-section to couple and secure the same together, and to cover and close the orifice when the half-sections are separated.

RENALDO SOLANO.

Witnesses:
C. W. FORBES,
W. H. LITTLE.